the# United States Patent [19]

Weiss

[11] Patent Number: 5,657,388
[45] Date of Patent: Aug. 12, 1997

[54] METHOD AND APPARATUS FOR UTILIZING A TOKEN FOR RESOURCE ACCESS

[75] Inventor: Kenneth P. Weiss, Newton, Mass.

[73] Assignee: Security Dynamics Technologies, Inc., Cambridge, Mass.

[21] Appl. No.: 213,951

[22] Filed: Mar. 16, 1994

Related U.S. Application Data

[63] Continuation-in-part of Ser. No. 67,517, May 25, 1993, Pat. No. 5,485,519.
[51] Int. Cl.$^6$ ........................................ H04L 9/32
[52] U.S. Cl. .......................... 380/23; 380/24; 380/25; 380/30; 380/49; 340/825.31; 340/825.34; 235/379; 235/380; 235/382
[58] Field of Search .............................. 380/4, 23, 24, 380/25, 30, 49, 50; 235/379, 380, 382; 340/825.31–825.34

[56] References Cited

U.S. PATENT DOCUMENTS

| | | | |
|---|---|---|---|
| 3,764,742 | 10/1973 | Abbott et al. | 380/23 |
| 3,956,615 | 5/1976 | Anderson et al. | 380/24 |
| 4,123,747 | 10/1978 | Lancto et al. | 380/25 |
| 4,302,810 | 11/1981 | Bouricius et al. | 380/24 |
| 4,856,062 | 8/1989 | Weiss | 380/23 |
| 4,885,778 | 12/1989 | Weiss | 380/48 |
| 4,998,279 | 3/1991 | Weiss | 380/23 |
| 5,023,908 | 6/1991 | Weiss | 380/23 |
| 5,058,161 | 10/1991 | Weiss | 380/23 |
| 5,097,505 | 3/1992 | Weiss | 380/23 |
| 5,168,520 | 12/1992 | Weiss | 380/23 |
| 5,237,614 | 8/1993 | Weiss | 380/23 |
| 5,280,527 | 1/1994 | Gullman et al. | 380/23 |
| 5,367,572 | 11/1994 | Weiss | 380/23 |

OTHER PUBLICATIONS

Information Week, "The Future of Data Security Looks Credit-Card Thin", pp. 24–30, Oct. 7, 1985.

*Primary Examiner*—Bernarr E. Gregory
*Attorney, Agent, or Firm*—Wolf, Greenfield & Sacks, P.C.

[57] ABSTRACT

A method and apparatus for utilizing a token which is preferably a "dumb token" to provide secure access by authorized users to a selected resource. The token stores a secret user code in machine readable form, which code is read by a token processor. The token processor also receives a time-varying value and an algorithm, both of which may be stored or generated at either the token or the token processor and preferably a secret personal identification code which may be inputted at the token, but is preferably inputted at the token processor. The secret user code, time-varying value and secret personal identification code are then algorithmically combined by the algorithm, preferably in the token processor, to generate a one-time nonpredictable code which is transmitted to a host processor. The host processor utilizes the received one-time nonpredictable code to determine if the user is authorized access to the resource and grants access to the resource if the user is determined to be authorized. The system may be modified to operate in query/response mode. The token processor may be any of a variety of available portable remote processors or may be a device such as a telephone which is equipped with card or other token reader and with processing capability.

19 Claims, 2 Drawing Sheets

METHOD AND APPARATUS FOR UTILIZING A TOKEN FOR RESOURCE ACCESS

RELATED INVENTIONS

This application is a continuation-in-part of application Ser. No. 08/067,517, filed May 25, 1993, entitled ENHANCED SECURITY FOR A SECURE TOKEN CODE, now U.S. Pat. No. 5,485,519.

FIELD OF THE INVENTION

This invention relates to techniques for controlling access to electronic information or other resources and more particularly to a method and apparatus for securely controlling access to such resources by use of a relatively simple token in conjunction with a remote and/or portable processor.

BACKGROUND OF THE INVENTION

There are many applications where information resources, such as databases, are maintained, which resources containing sensitive information to which authorized individuals require access, but to which there may be legal, moral, privacy, business or other reasons for denying access to unauthorized individuals. Examples of such resources or databases include medical records at a hospital or other medical facility where selected personnel, such as doctors or nurses working with a particular patient, may require access to such records without undue delay while at the same time such records are not made available to other hospital personnel not having a need to know or to nonhospital personnel. Similarly, companies may have engineering, business, accounting, or other company records in a data processing system, with authorized individuals requiring easy access to only selected portions of the database and with access otherwise being denied. A resource may also be a building, room, file cabinet, safe, container or other area or item to which it is desired that access be limited only to authorized individuals. The term "resource" as used hereinafter will generally be considered to include both information resources and these other types of resources.

Heretofore, control of access to such resources has been primarily achieved by use of a personal identification code (PIN) or password known only to the user which the user keys or dials into the system before making an access request. However, since this is a static value, an unauthorized individual may surreptitiously learn an authorized party's PIN by for example monitoring a data line over which such PIN is being transmitted or surreptitiously observing the PIN being inputted. The fact that the PIN has been compromised may not be learned for some time during which large quantities of data or other resources may be improperly obtained and/or used. Further, once an individual has access to the system, he may make changes in the database or other resources which may cause additional serious problems to the organization.

Password systems use only one of the three possible factors which are available to provide a secure system, namely, something the user knows. The other two factors are something an authorized individual has, for example a token, and something the individual is, for example a biocharacteristic. More secure resource access systems involve at least two of the factors, normally something the individual knows and something the individual has in his possession. However, it has been found that tokens containing a secret (i.e. nonobservable) static code value are also subject to surreptitious detection by for example the monitoring of a line over which such value is being transmitted. This problem is being exacerbated by the more extensive use of local and wide area networks and by the use of radio-waves to transmit data. It is also possible that the token could be "borrowed", read by a suitable device to obtain the secret user code and then returned before the owner realizes it is missing. In either event, the token containing the code could be recreated and used for some period of time to gain access to sensitive information within a database or to other information resources without detection. Therefore, improved "smart" tokens, such as those disclosed in U.S. Pat. Nos. 4,720,860 and 5,023,908 and various related patents have varied the values stored in the token, or at least the value outputted from the token, in accordance with some algorithm which causes the values to vary in a nonpredictable way with time so as to provide unique one-time codes.

However, while such devices have provided significantly enhanced security for secret access codes, and therefore significantly enhanced security for the data processing system, database or other information resource with which such devices are being utilized, a "smart" card (which for purposes of this application as defined as a card having data processing capability) has been required to use such systems. Smart cards are usually somewhat larger and heavier than a standard credit card and are significantly more expensive. Since these devices are typically battery-operated, they also have a finite life, typically about three years, and need to be replaced at the end of such time, further increasing the cost of their use. For systems having large numbers of authorized users, this expense can become substantial and, in conjunction with some resistance to the bulk of such cards, has limited the applications of such systems.

A need therefore exists for an improved secure access technique which provides the advantages of one-time code and the possibility of two factor security while permitting the use of inexpensive and relatively small tokens, which tokens may have a theoretically unlimited life.

SUMMARY OF THE INVENTION

In accordance with the teachings of this invention, a "dumb token" is utilized which preferably only stores selected information which may be utilized to identify or verify the identity of a user, and/or provide data for an encryption key and/or for file compression, such information being stored in machine readable form. The token is designed for use with a standard remote and/or portable processor such as (i) a lap-top computer, notebook computer, palm-top (i.e. hand-held) computer or personal assistant or (ii) a telephone, credit card verifier or other device having a keyboard/keypad (or equivalent), card or other token reader, and processor, which processor/device (hereinafter "token processor") usually also provides an interface to a host processor, network, file server, other remote resource or the like (hereinafter "host processor"). The token processor is utilized to generate a one-time, nonpredictable code from inputs received both from the token and from the user through a token processor input device and to automatically utilize directly and/or transmit such code or a representation of such code to the host processor where it may be utilized for such functions as identifying the individual, verifying access to the resource or inferring an encryption key as taught in U.S. Pat. No. 5,237,614.

The basic system may be utilized in a number of ways. For example, the token may also contain a public ID for the user which is initially read and transmitted to the host, which then generates a query appropriate for such user. The query is transmitted to the token processor which then uses the query in conjunction with a secret user code read from the token, and preferably a PIN or other coded input from the user, to produce a nonpredictable one-time coded response which is transmitted to the host. A time-varying, event varying, use varying or the like value (hereinafter "time-varying value" or "one-time code") produced or stored at the token processor may also be utilized in generating the nonpredictable coded response.

For the preferred embodiment, the portable processor utilizes a clock as a time-varying value element. For an alternative embodiment, the time-varying value element changes its value each time a token is used with the token processor. This change may, for example, be made when the token is inserted or when the token is removed. One option which may be used with the system is that, instead of a static secret code being stored in the token, a value, such as the nonpredictable code generated during the last use, some intermediate value in the generation thereof, or another related value is stored in the token as a secret user code in place of the value previously stored therein. When this is done, it may not be necessary to include a time-varying value element as an input in the generation of the nonpredictable code since, in essence, the time-varying secret code assures that a different nonpredictable code will be generated for each use.

While it is preferable that the token store as little information as possible, there are applications where it is advantageous to store the algorithm to be used in generating the nonpredictable code in the token. This permits a different algorithm to be used for each individual on the system, or at least for selected groups of individuals, further enhancing system security. This is particularly desirable where a single token processor may be utilized by multiple individuals, for example in a hospital environment where nurses on different shifts may use the same token processors. It is also possible for the time-varying value to be stored in the token rather than at the token processor. For example, a value originally stored on the token may be incremented or decremented in a predetermined way each time the token is utilized and its value may be read into the token processor to be used as the time-varying value in the algorithm for generating the nonpredictable code. Again, this procedure may be advantageous when a single token processor is used by a variety of individuals since it eliminates the requirement for the token processor to store appropriate clock values for each individual. However, in applications where the processor clock itself is used as the time-varying input, this is not a problem so long as this clock is synchronized with the clock at the host. A technique to compensate for any lack of such synchronization is taught in U.S. Pat. No. 4,885,778. An alternate technique is for some hash/representation of the remote processor time to be transmitted along with the one-time code as taught in application Ser. No. 07/981,808 filed Feb. 5, 1993, now U.S. Pat. No. 5,361,062.

The transmitter at the portable processor and receiver at the host processor may be modems interconnected by a telephone line network interface or the transmitter and receiver may be elements of a radio/cellular network. Other communication techniques between processors known in the art may also be utilized. Further, while for the preferred embodiment the token is a "dumb card", there are applications where a "smart card" having processing capabilities and its own clock may be utilized which may be used in the manner described in the prior patents as a smart card when token processors are not available, but may be used with a token processor, with the seed or secret user code stored thereat being read into the token processor in situations where it is preferable to operate in that mode. The token containing the machine readable secret user code may also be used to perform other functions such as supplemental memory (i.e. RAM or ROM chip containing files, application software, privileged or confidential data, private encription keys single sign-on information, etc.) or hardware/software for additional system features such as modem, network interface, FAX, combined and integrated encryption/compression engine, etc.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
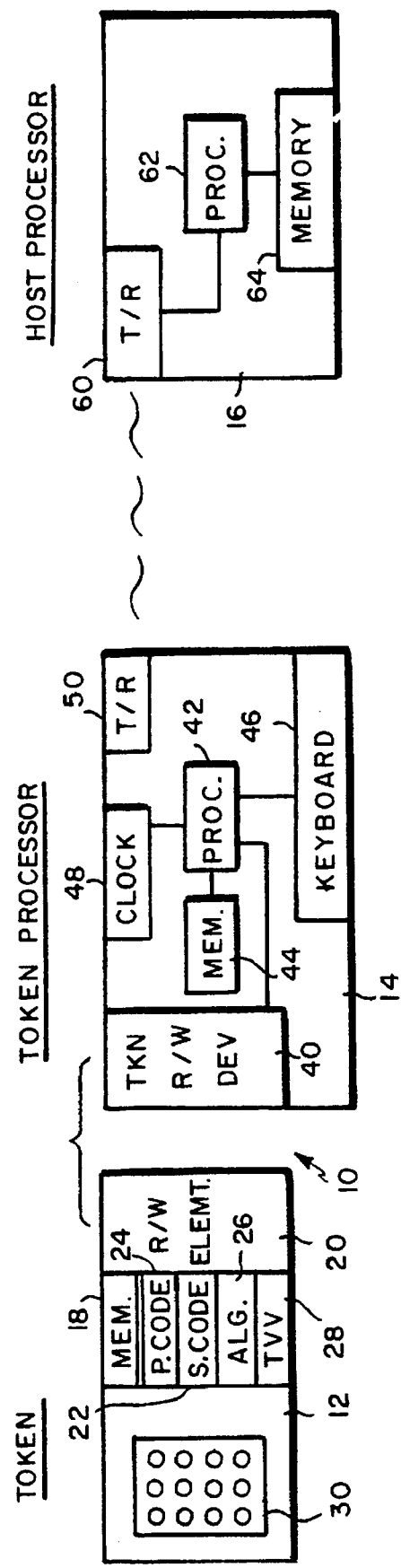
FIG. 1 is a semi-schematic diagram of hardware for practicing the teachings of this invention.

FIG. 1 illustrates the three basic components of a system 10 utilized in practicing the teachings of this invention, these components being a token 12, a token processor 14, and a host processor 16. Token 12 is preferably a "dumb" token which contains only a memory 18 and a machine readable element, or for some embodiments a read/write element, 20. In the simplest case, memory 18 would contain only a secret user code 22. However, for various embodiments of the invention, it may also be desirable for memory 18 to store a public code 24, an algorithm 26 and/or a time-varying value 28. As will be discussed in greater detail later, for some embodiments, the secret user code 22 and time-varying value 28 may be the same value. While not preferred, it is possible for token 12 to have an input device, such as numeric keypads 30, and, as will be discussed later, to also function as a "smart card", having certain processing and/or display capabilities.

Token processor 14 may be any of a variety of remote and/or portable processors which are currently available on the market. Such processors fall into two general classes, the first of which includes such processors as lap top computers, palm top (hand-held) computers, notebook computers, personal assistants, or other like computing devices. The recent proliferation of such computers, many of which have excess storage and processing capabilities as well as input/output capability such as floppy discs or links for a card or the like, such as a PCMCIA slot, or data button make such computers ideal for this application. The second class of devices include telephones, credit card verifiers or other like devices having a keyboard/keypad (or equivalent input device), a card reader or other device adapted to read a value stored on a token and a microprocessor or other processor device. Thus, token processor 14 would typically include a token reader or token read/write device 40, a microprocessor or other processing device 42, at least one memory device 44, which may be part of processor 42 or may be in addition to memory provided in processor 42, a keyboard or other data input device 46 for inputting data into processor 46, a clock 48 or other device for generating time-varying values and a transmitter, or preferably a transmitter/receiver, 50. For various processors 14, device 50 may be a modem which interconnects the processor to a telephone line, a network interface or may be some type of radio communications device such as a cellular phone element.

Device 50 communicates with a compatible device 60 at host processor 16. Host processor 16 would typically be a processor utilized for performing a variety of functions, and may for example be a server through which access may be obtained to various databases or other information resources or may be some other remote resource. Host processor 16 may be part of a network, which network may contain a plurality of such processors. The function of host processor 16 which is of concern in connection with this invention is to at least verify that the user possessing token 16 is authorized access to the system. In performing this function, host processor 16 utilizes a processor element 62 contained thereat and memory 64 containing information on tokens and authorized users for such tokens. Once host processor 16 has verified a user, it may grant the user access to certain resources and may also perform a variety of other functions which are not part of the present invention.

Figure 2:
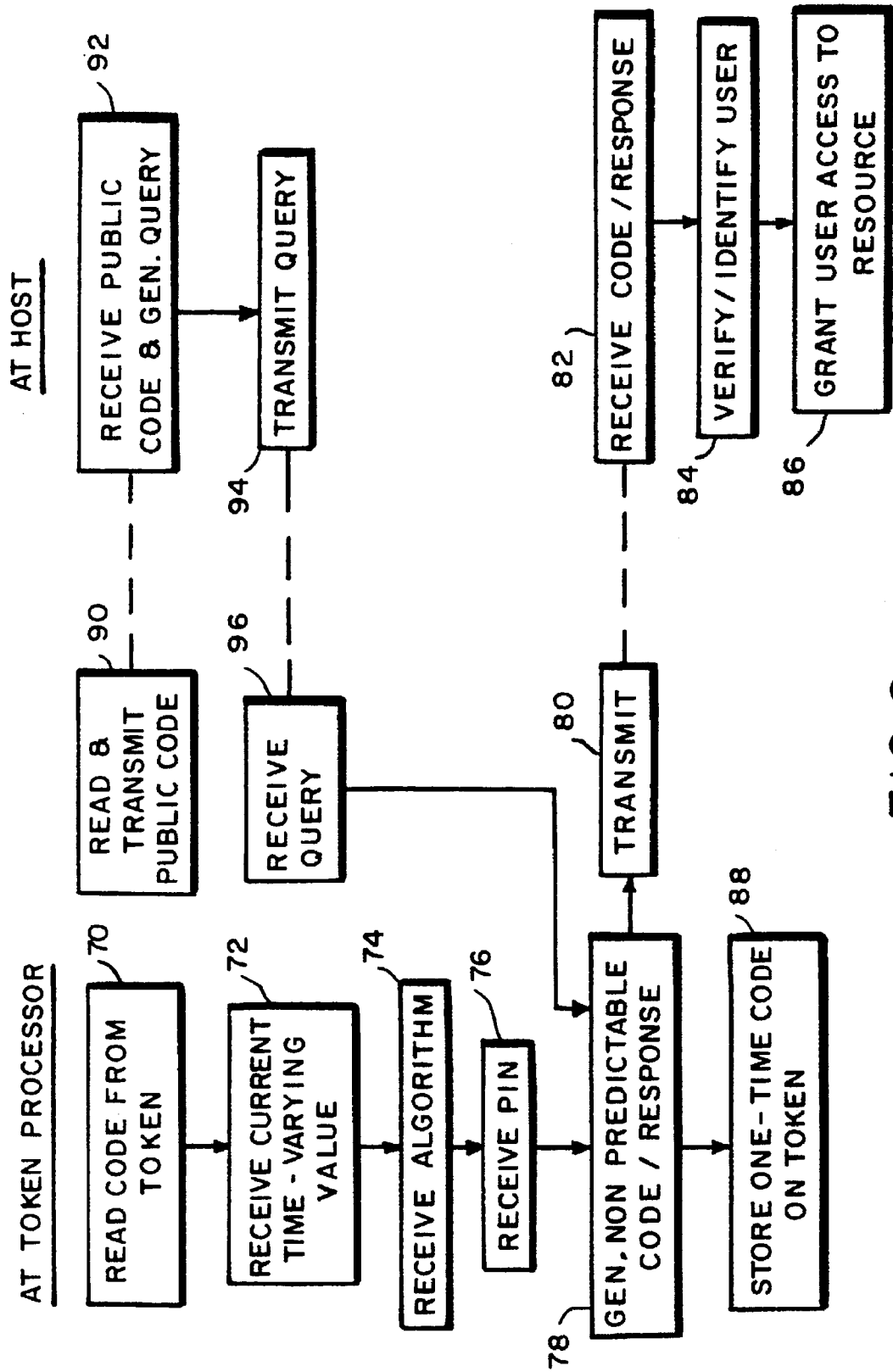
FIG. 2 is a flow diagram for the operation of the system of FIG. 1 in accordance with practicing various embodiments of the invention.

Referring now to FIG. 2, the first step in the use of the system 10 is for a user to insert the read/write element 20 of token 12 into the token read/write device 40 of token processor 14. Where the read/write element 20 is for example a magnetic stripe or electrodes, this operation would involve physically inserting at least a portion of token 12 into read/write device 40. Where optical elements, such as light-emitting diodes (LED's) and photo diodes or infra-red emitters and detectors, or RF elements are utilized as the read/write elements, this operation would be performed by bringing the token read/write element into proximity with the read/write device of the token processor. In either event, when this is done, one or more stored codes, and possibly additional information, is read from the token into token processor 14 (step 70). The information to be read out would typically either be scanned by the device 40 under control of processor 42 or would be sequentially presented.

For a preferred embodiment, only a secret code 22 is stored in token 12 and this is the code which is read during step 70. This code is applied as one input to processor 42. The current time-varying value at clock 48 is also applied as an input to processor 42 (step 72) and the processor also receives from memory 44 or its internal memory an algorithm for utilizing the received inputs to generate a one-time nonpredictable code (step 74). Finally, the user utilizes keyboard 46 to input the user's personal identification number (PIN) or other secret code which is generally known only to the user (step 76). The PIN which may modify the token code is applied as the final input to processor 42 which then utilizes the secret code from the token, the time-varying or one-time value from clock 48 and the received PIN in the algorithm to generate a selected nonpredictable code. Since a time-varying value is involved in the generation of this code, this code will be a one-time code so that, should anyone surreptitiously intercept the code, the code will be of no value to that person since it will not be operative to gain access to the resource in the future. The one-time nonpredictable code generated during step 78 is then transmitted to host processor 16 during step 80.

At host processor 16, the nonpredictable code is received by device 60 (step 82) and is provided to processor 62. Processor 62 may operate in an identify mode, in which case the inputted code is compared against codes for the given time interval for authorized users and the user is identified as an authorized user if the received one-time nonpredictable code matches a code for the given time interval being generated at the host. Where the time-varying input is from a clock such as clock 48, this clock would normally be required to be in synchronism with a corresponding clock at host processor 16 in order for identification to occur. U.S. Pat. No. 4,885,778 teaches a mechanism which may be utilized in practicing the teachings of this invention which permits such identification to be achieved when the clocks are out of synchronism and permits the clocks to be resynchronized. It is also possible during step 84 for processor 62 to operate in a verify mode. With verify, public code 24 is also transmitted with the one-time nonpredictable code. The public code may be obtained from token 12 or may be stored at token processor 14. Processor 62 utilizes the received public code to retrieve or generate the proper one-time nonpredictable code for the user indicated by the public code and then compares this with the received one-time nonpredictable code to verify the user.

A successful verification or identification during step 84 results in processor 62 granting the user access to the selected resource (step 86). The specific manner in which access to the resource is granted will depend on application and the specific way this is accomplished does not form part of the present invention. For example, in a hospital application, once access has been granted, a user may use keyboard 46 to request medical records on at least selected patients, with such requests being transmitted to host processor 60, and host processor 60 may retrieve such records from its memory 64 and transmit such records to processor 14 to either be displayed thereat, printed out or otherwise made available to the user.

One option is that instead of a static secret user code 22 being stored in token 12, either the one-time nonpredictable code generated by processor 42, some intermediate value produced in the generation of the nonpredictable code, or some other related value is written in memory 18 of token 12 as the secret user code after each use. Since this value is a one-time time-varying code, use of this value could eliminate the need for clock 48 being used as an additional input to processor 42 and therefore eliminate the synchronization problem. However, this could only be done if the token 12 is being utilized with only a single host processor 16 or if the host processors 16 are somehow networked so that each host processor can be made aware of the current one-time code being stored at the token. The storing of this one-time code in the token is illustrated by step 88.

Another option is for system 10 to operate in a query/response mode. When operating in this mode, in addition to the steps previously described, public code 24 is also read from token 12 and is transmitted by token processor 14 to host processor 16 (step 90). The transmitted public code is received at transmitter/receiver device 60 of host processor 16 and is applied to processor 62 which utilizes this public code to generate a query which may be unique for the given user (step 92). The query is then transmitted by device 60 of the host processor (step 94) and received by device 50 at the token processor (step 96). The received query is applied to processor 42 as an additional input which is utilized along with the secret code read from token 12, the time-varying value and the PIN in an algorithm to generate an appropriate one-time nonpredictable coded response (step 78). This response is then transmitted during step 80 to the host processor where it is received and applied to processor 62 which verifies that the response is correct and grants access to the resource in response to a verified response.

It is also possible that the public code transmitted during step 90 could be used by the host processor during step 84 to retrieve the proper nonpredictable code to verify the user. When this is done, receive PIN step 76 may not be required, but this step is still desirable for added security.

While receiving the current time-varying value during step 72 is normally achieved by reading the current clock value 48, as previously discussed, this step may be eliminated where a one-time code is stored as the secret user code 22 rather than a static secret code. It is also possible, in some applications, that token 12 maybe used with a variety of token processor, all of which are not in time synchronization. It may, in such situations, be preferable for token 12 to contain its own clock, which clock is read and used as a current time-varying value during step 72. Alternatively, token 12 may store a one-time time-varying value 28 which is changed each time the token is used, or in response to the occurrence of a selected event. In this case, the code value may be read out for use when a token is read during step 70 and this value may be modified in accordance with a predetermined algorithm, with the modified value then being stored in area 28 of memory. Alternatively, the value may for example be changed each time a resource is accessed during a given session with the final time-varying value being stored in area 28 before the token is removed from token processor 14. Other techniques for generating a one-time code known in the art may also be utilized.

Similarly, receive-algorithm step 74 normally involves obtaining the algorithm from the memory of processor 42 or from backup memory 44. However, it is generally desirable that the algorithm be secure and in some applications it may be easier to maintain security of the tokens than of the token processors. Further, it may also be desirable in some applications that the algorithm utilized for generating the nonpredictable one-time codes be different for each user on the system or at least for certain classes of users. In such applications, these objectives may be achieved by storing the algorithm in token 12, for example in area 26 of its memory, and reading the algorithm from token 12 into processor 42 during step 74.

While in most applications token 12 would be a "dumb token" dedicated to the function of authenticating a user, this is by no means a limitation on the invention. For example, many processors now utilize a read/write device such as the device 40 as a slot in which cards containing additional functionality such as a modem function, network interface, fax, or the like may be contained. Such card may contain extra memory and other selected hardware. It is possible that one of these function cards could be used as a token by merely adding the user's secret code in such card and programming the token processor to read such code from the card and utilize it in the manner described above to identify/verify the user as part of the initial log-on procedure. Further, there may be applications where a particular user has need to use his token in applications where a token processor is not available, for example to gain access to the resource from a standard telephone. In such applications, a token such as that disclosed in the beforementioned U.S. Pat. No. 4,720,860 may be used which is capable of utilizing the stored seed and a time-varying value generated by its own internal clock to generate a one-time nonpredictable code which is displayed for use by the user. However, this token would also have a read/write element 20, permitting the seed to also be read into a token processor 14 to permit the token to also be used in system 10.

However, the need for a smart card discussed above might be eliminated where token processor 14 is for example a telephone such as those currently available in airline terminals and other public places which contain a credit card reader and other processing capabilities. In such applications, token 12 might contain the algorithm to be used in area 26 and might also contain a clock or the time-varying value in area 28. These would be read from the token by the token reader which forms part of the telephone and would be processed in the processor which also forms part of the telephone to produce the one-time nonpredictable code. The user could input his PIN on the touch keys of the telephone in response to either a visual prompt appearing on a small display which is provided with many such telephones or in response to an oral prompt provided to the telephone headset. The "dumb" token could thus be utilized at any location having such a telephone. Standard credit card verifiers could also be programmed to function as a token processor with dumb tokens in a system 10, and other devices either currently existing or developed in the future could be utilized, provided such device contains token reading capability, some type of input device to permit a PIN to be inputted, a processor which can be programmed to perform the one-time nonpredictable code generation function and at least a transmitter for transmitting such value to a host processor. Further, while for preferred embodiments access to the resources are gained only through the host, in some applications, access to at least some local resource(s) may be granted at or under control of the token processor. It has also been assumed that all processors utilized are programmable processors. However, in suitable applications, hybrid or special purpose processors may be utilized.

Thus, while the invention has been particularly shown and described above with reference to preferred embodiments, the foregoing and other changes in form and detail may be made therein by one skilled in the art without departing from the spirit and scope of the invention.

What is claimed is:

1. A system for providing secure access by an authorized user to a selected resource comprising:

a token in the possession of the user which stores a secret user code for the system, said code being stored in a machine readable form;

a token processor having a reader for said token, a time-varying value element, a code input device, means for receiving the secret user code read from the token and the time-varying value and for generating a one-time nonpredictable code in response thereto, and a transmitter for transmitting the generated nonpredictable code; and a host processor having a receiver for the transmitted nonpredictable code, and means responsive to a received nonpredictable code for authorizing access to said selected resource.

2. A system as claimed in claim 1 wherein said token also stores a public code in machine readable form, wherein the token reader of said token processor reads said public code and said means for transmitting transmits the read public code to the host processor, wherein the host processor generates a selected query in response to the received public code, which query is transmitted to the portable processor, and wherein the nonpredictable code is a response to the query which is a function of at least the query and the secret code read from the token.

3. A system as claimed in claim 2 wherein the response is also a function of a secret personal identification code inputted by user.

4. A system as claimed in claim 1 wherein the time-varying value element is a clock.

5. A system as claimed in claim 1 wherein the time-varying value element varies the value each time a token is used with the portable processor.

6. A system as claimed in claim 5 including means for storing at least one of each generated nonpredictable code, an intermediate value used in generating each nonpredictable code and another value related to the nonpredictable code as the secret user code in the token in place of the code previously stored.

7. A system as claimed in claim 1 wherein said token also stores an algorithm usable by the token processor to generate the nonpredictable code, said algorithm being read into the token processor by the token reader and utilized by the means for receiving and generating to generate the nonpredictable code.

8. A system as claimed in claim 1 wherein the means for generating a nonpredictable code also receives and utilizes a secret personal identification code inputted by the user.

9. A system as claimed in claim 8 wherein the secret personal identification code is inputted by the user on the code input device of the token processor.

10. A system as claimed in claim 8 wherein the token includes a code input device, the secret personal identification code being inputted to the token by the user on said code input device, and wherein the secret personal identification code is read by the means for receiving.

11. A system as claimed in claim 10 wherein said token includes means for algorithmically combining said secret user code and said secret personal identification code; and wherein said means for receiving reads the output from said means for algorithmically combining.

12. A system as claimed in claim 1 wherein said transmitter and said receiver are modems interconnected by a telephone line.

13. A system as claimed in claim 1 wherein said transmitter and said receiver are elements of a radio network.

14. A system as claimed in claim 1 wherein said transmitter and receiver are elements of a network interface.

15. A system as claimed in claim 1 wherein said token also includes a one-time code generator and a means responsive to the secret user code stored thereon and to a current one-time code for generating a readable nonpredictable code.

16. A system as claimed in claim 1 wherein the token processor is a telephone having a token reader and a processor associated therewith.

17. A system for providing secure access by an authorized user to a selected resource comprising:
a token in the possession of the user which stores a secret user code for the system, said code being stored in a machine readable form; and
a token processor having a reader for said token, a time-varying value element, a code input device, means for receiving the secret user code read from the token, a secret personal identification code inputted on the input device by the user and the time-varying value and for generating a one-time nonpredictable code in response thereto, and means responsive to the generated one-time nonpredictable code for causing the acceptability of the code to be determined and for authorizing access to said selected resource in response to a determination that the nonpredictable code is acceptable.

18. A method for providing secure access by an authorized user to a selected resource comprising the steps of:
a) reading a secret user code from a token into a token processor;
b) obtaining a time-varying value and an algorithm at the token processor;
c) the token processor receiving a user inputted secret personal identification code;
d) the token processor utilizing the secret user code, time-varying value and secret personal identification code in the algorithm to obtain a one-time nonpredictable code;
e) the token processor transmitting the generated one-time nonpredictable code to a host processor;
f) the host processor utilizing the received nonpredictable code to determine if the user is authorized for access to the resource; and
g) the host processor granting the user access to the resource in response to a determination that the user is authorized.

19. A method as claimed in claim 18 including the steps of:
h) the token processor reading a public code from the token and transmitting the public code to the host processor;
i) the host processor utilizing the public code to generate a query and transmitting the query to the token processor; and
j) the token processor utilizing the query during step (d) in generating a one-time nonpredictable code which is also a response to the query;
k) step (f) including the step of verifying that the correct response is received.

* * * * *